United States Patent
Wipfel et al.

[11] Patent Number: 6,151,688
[45] Date of Patent: Nov. 21, 2000

[54] RESOURCE MANAGEMENT IN A CLUSTERED COMPUTER SYSTEM

[75] Inventors: Robert A Wipfel, Sandy; David Murphy, Herriman, both of Utah

[73] Assignee: Novell, Inc.

[21] Appl. No.: 09/024,011

[22] Filed: Feb. 14, 1998

Related U.S. Application Data

[60] Provisional application No. 60/038,251, Feb. 21, 1997.

[51] Int. Cl.[7] ............................................. G06F 11/00
[52] U.S. Cl. .............................. 714/48; 709/224; 714/47
[58] Field of Search ................................ 714/5, 48, 49, 714/718, 8, 39, 42, 43, 47, 55, 57; 709/224, 223, 226, 251

[56] References Cited

U.S. PATENT DOCUMENTS

| | | | |
|---|---|---|---|
| 5,067,107 | 11/1991 | Wade | 395/500.42 |
| 5,197,130 | 3/1993 | Chen et al. | 711/147 |
| 5,666,486 | 9/1997 | Alfieri et al. | 709/223 |
| 5,790,780 | 8/1998 | Brichta et al. | 714/47 |
| 5,796,939 | 8/1998 | Berc et al. | 714/47 |
| 5,867,483 | 2/1999 | Ennis, Jr. et al. | 714/47 |
| 5,878,420 | 3/1999 | De La Salle | 709/224 |
| 5,886,643 | 3/1999 | Diebboll et al. | 709/224 |
| 5,923,840 | 7/1999 | Desnoyers et al. | 714/48 |
| 5,958,009 | 9/1999 | Friedrich et al. | 709/224 |
| 5,964,891 | 10/1999 | Caswell et al. | 714/48 |

OTHER PUBLICATIONS

Cobb, "HP Introduces Comprehensive Support–Management Tool for UNIX–Based System," Business Wire, Jun. 1992.

*Primary Examiner*—Ly V. Hua
*Assistant Examiner*—Christopher Revak
*Attorney, Agent, or Firm*—Computer Law++

[57] ABSTRACT

Methods, systems, and devices are provided for managing resources in a computing cluster. The managed resources include cluster nodes themselves, as well as sharable resources such as memory buffers and bandwidth credits that may be used by one or more nodes. Resource management includes detecting failures and possible failures by node software, node hardware, interconnects, and system area network switches and taking steps to compensate for failures and prevent problems such as uncoordinated access to a shared disk. Resource management also includes reallocating sharable resources in response to node failure, demands by application programs, or other events. Specific examples provided include failure detection by remote memory probes, emergency communication through a shared disk, and sharable resource allocation with minimal locking.

73 Claims, 5 Drawing Sheets

RESOURCE MANAGEMENT IN A CLUSTERED COMPUTER SYSTEM

RELATED APPLICATIONS

This application claims the benefit of commonly owned copending U.S. patent application Ser. No. 60/038,251 filed Feb. 21, 1997.

FIELD OF THE INVENTION

The present invention relates to resource management in a system of interconnected computers, and more particularly to the monitoring and allocation of cluster nodes, cluster memory, and other cluster computing resources.

TECHNICAL BACKGROUND OF THE INVENTION

Those portions of U.S. patent application Ser. No. 60/038, 251 filed Feb. 21, 1997 which describe previously known computer system components and methods are incorporated herein by this reference. These incorporated portions relate, without limitation, to specific hardware such as processors, communication interfaces, and storage devices; specific software such as directory service providers and the NetWare operating system (NETWARE is a mark of Novell, Inc.); specific methods such as TCP/IP protocols; specific tools such as the C and C++ programming languages; and specific architectures such as NORMA, NUMA, and ccNUMA. In the event of a conflict, the text herein which is not incorporated by reference shall govern. Portions of the '251 application which are claimed in this or any other Novell patent application are not incorporated into this technical background.

Clusters

A cluster is a group of interconnected computers which can present a unified system image. The computers in a cluster, which are known as the "cluster nodes", typically share a disk, a disk array, or another nonvolatile memory. Computers which are merely networked, such as computers on the Internet or on a local area network, are not a cluster because they necessarily appear to users as a collection of connected computers rather than a single computing system. "Users" may include both human users and application programs. Unless expressly indicated otherwise, "programs" includes programs, tasks, threads, processes, routines, and other interpreted or compiled software.

Although every node in a cluster might be the same type of computer, a major advantage of clusters is their support for heterogeneous nodes. As an unusual but nonetheless possible example, one could form a cluster by interconnecting a graphics workstation, a diskless computer, a laptop, a symmetric multiprocessor, a new server, and an older version of the server. Advantages of heterogeneity are discussed below.

To qualify as a cluster, the interconnected computers must present a unified interface. That is, it must be possible to run an application program on the cluster without requiring the application program to distribute itself between the nodes. This is accomplished in part by providing cluster system software which manages use of the nodes by application programs.

In addition, the cluster typically provides rapid communication between nodes. Communication over a local area network is sometimes used, but faster interconnections are much preferred. Compared to a local area network, a cluster system area network has much lower latency and much higher bandwidth. In that respect, system area networks resemble a bus. But unlike a bus, a cluster interconnection can be plugged into computers without adding signal lines to a backplane or motherboard.

Clustering Goals

Clusters may improve performance in several ways. For instance, clusters may improve computing system availability. "Availability" refers to the availability of the overall cluster for use by application programs, as opposed to the status of individual cluster nodes. Of course, one way to improve cluster availability is to improve the reliability of the individual nodes.

However, at some point it becomes cost-effective to use less reliable nodes and swap nodes out when they fail. A node failure should not interfere significantly with an application program unless every node fails; if it must degrade, then cluster performance should degrade gracefully. Clusters should also be flexible with respect to node addition, so that applications benefit when a node is restored or a new node is added. Ideally, the application should run faster when nodes are added, and it should not halt when a node crashes or is removed for maintenance or upgrades.

Adaptation to changes in node presence provides benefits in the form of increased heterogeneity. improved scalability, and better access to upgrades. Heterogeneity allows special purpose computers such as digital signal processors, massively parallel processors, or graphics engines to be added to a cluster when their special abilities will most benefit a particular application, with the option of removing the special purpose node for later standalone use or use in another cluster. Heterogeneity also allows clusters to be formed using presently owned or leased computers, thereby increasing cluster availability by reducing cost and delay. Scalability allows cluster performance to be incrementally improved by adding new nodes as one's budget permits. The ability to add heterogeneous nodes also makes it possible to add improved hardware and software incrementally.

Clusters may also be flexible concerning the use of whatever nodes are present. For instance, some applications will benefit from special purpose nodes such as digital signal processors or graphics engines. Ideally, clusters support three types of application software: applications that take advantage of special purpose nodes, applications that view all nodes as more or less interchangeable but are nonetheless aware of individual nodes, and applications that view the cluster as a single unified system. "Cluster-aware" applications include distributed database programs that expect to run on a cluster rather than a single computer. Cluster-aware programs often influence the assignment of tasks to individual nodes, and typically control the integration of computational results from different nodes.

The following situations illustrate the importance of availability and other cluster performance goals. The events described are either so frequent or so threatening (or both) that they should not be ignored when designing or implementing a cluster architecture.

Software Node Crash

Software errors, omissions, or incompatibilities may bring to a halt any useful processing on a node. The goal of maintaining cluster availability dictates rapid detection of the crash and rapid compensation by either restoring the node or proceeding without it. Detection and compensation may be performed by cluster system software or by a cluster-aware application. Debuggers may also be used by programmers to identify the source of certain problems. Sometimes a software problem is "fixed" by simply rebooting the node. At other times, it is necessary to install different software or change the node's software configuration before returning the node to the cluster. It will often be necessary to restart the interrupted task on the restored node or on another node, and to avoid sending further work to the node until the problem has been fixed.

Hardware Node Crash

Hardware errors or incompatibilities may also prevent useful processing on a node. Once again availability dictates rapid detection of the crash and rapid compensation, but in this case compensation often means proceeding without the node.

In many clusters, working nodes send out a periodic "heartbeat" signal. Problems with a node are detected by noticing that regular heartbeats are no longer coming from the node. Although heartbeats are relatively easy to implement, they continually consume processing cycles and bandwidth. Moreover, the mere lack of a heartbeat signal does not indicate why the silent node failed; the problem could be caused by node hardware, node software, or even by an interconnect failure.

Interconnect Failure

If the interconnection between a node and the rest of the cluster is unplugged or fails for some other reason, the node itself may continue running. If the node might still access a shared disk or other sharable resource, the cluster must block that access to prevent "split brain" problems (also known as "cluster partitioning" or "sundered network" problems). Unless access to the shared resource is coordinated, the disconnected node may destroy data placed on the resource by the rest of the cluster.

Accordingly, many clusters connect nodes both through a high-bandwidth low-latency system area network and through a cheaper and less powerful backup link such as a local area network or a set of RS-232 serial lines. The system area network is used for regular node communications, the backup link is used when the system area network interconnection fails. Unfortunately, adding a local area network that is rarely used reduces the cluster's cost-effectiveness. Moreover, serial line protocols used by different nodes are sometimes inconsistent with one another, making the backup link difficult to implement.

Sharable Resource Reallocation

Sharable resources may take different forms. For instance, shared memory may be divided into buffers which are allocated to different nodes as needed, with the unallocated buffers kept in a reserve "pool". In some clusters, credits that can be redeemed for bandwidth, processing cycles, priority upgrades, or other resources are also allocated from a common pool.

Nodes typically have varying needs for sharable resources over time. In particular, when a node crashes or is intentionally cut off from the cluster to prevent split-brain problems, the shared buffers, credits, and other resources that were allocated to the node are no longer needed; they should be put back in the pool or reallocated to working nodes. Many clusters do this by locking the pool, reallocating the resources, and then unlocking the pool. Locking the pool prevents all nodes except the allocation manager from accessing the allocation lists while they are being modified, thereby preserving the consistency of the lists. Locking is implemented using a mutex or semaphore. Unfortunately, locking reduces cluster performance because it may block processing by all nodes.

Summary

In short, improvements to cluster resource management are needed. For instance, it would be an advance in the art to distinguish further between different causes of cluster node failure. It would also be an advance to provide a way to coordinate shared resource access when an interconnect fails without relying on a local area network or a serial link. In addition, it would be an advance to reallocate sharable resources without interrupting work on all nodes. Such improved systems and methods are disclosed and claimed herein.

BRIEF SUMMARY OF THE INVENTION

The present invention provides methods, systems, and devices for resource management in clustered computing systems. The invention aids rapid, detailed diagnosis of communication problems, thereby promoting rapid and correct compensation by the cluster when a communication failure occurs.

When a node or part of a system area network becomes inoperative, remote probing retrieves either a value identifying the problem or an indication that the remote memory is inaccessible; verifying inaccessibility also aids in problem diagnosis. In various embodiments the retrieved value may include a counter, a validation value, a status summary, an epoch which is incremented (or decremented) by each restart or each reboot, a root pointer that bootstraps higher level communication with other cluster nodes, and a message area that provides additional diagnostic information.

Remote memory probing allows the system to more effectively select between different compensating steps when an error condition occurs. One of the most potentially damaging problems is a "split brain." This occurs when two or more nodes cannot communicate to coordinate access to shared storage. Thus, a significant risk arises that the node will corrupt data in their shared storage area. In some embodiments, the invention uses an emergency message location on a shared disk to remove the failed node from the cluster while allowing the failed node to be made aware of its status and thus prevent data corruption. The remaining active nodes may also coordinate their behavior through the emergency message location. When a node is disconnected from a cluster the invention provides methods that make reduced use of locks by coordinating locking with interrupt handling to release the global resources that were previously allocated to the node. These methods also provide an improved system to reallocate resources throughout the cluster. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to methods, devices, and systems for managing resources in a clustered computing system. Before detailing the architectures of the invention, the meaning of several important terms is clarified. Specific examples are given to illustrate aspects of the invention, but those of skill in the art will understand that other examples may also fall within the meaning of the terms used. Some terms are also defined, either explicitly or implicitly, elsewhere herein. In particular, all portions of U.S. patent application Ser. No. 60/038,251 filed Feb. 21, 1997, which were not incorporated by reference into the technical background above are hereby incorporated by reference into this detailed description. In the event of a conflict, the text herein which is not incorporated by reference shall govern.

Some Terminology

As used here, "cluster" means a group of at least two interconnected computers ("anodes") which can present a unified system image. Note that the cluster may also support execution of cluster-aware applications which pierce the unified system image to directly influence or control the division of labor between nodes. In many cases, but not all, the cluster will also include a shared disk or shared disk array or other shared nonvolatile storage subsystem which is directly accessible to more than one of the nodes.

The interconnected cluster nodes form a "system area network" which differs from legacy networks in that system area networks support presentation of a unified system image while legacy networks do not. Toward this end, system area networks generally have much greater bandwidth and much lower latency than legacy networks. Bandwidth and latency are thus measured with respect to local area networks and other legacy networks, and the numbers will change as the technologies of both system area networks and legacy networks advance.

As used here, "legacy network" includes many local area networks, wide area networks, metropolitan area networks, and/or various "Internet" networks such as the World Wide Web, a private Internet, a secure Internet, a value-added network, a virtual private network, an extranet, or an intranet. Clusters may be standalone, or they may be connected to one or more legacy networks; discussions of the cluster as a "node" on a legacy network should not be confused with discussions of intra-cluster nodes. Clusters may also use a legacy network as a backup link, as discussed in connection with FIG. 2, for instance.

Clusters Generally

Figure 1:
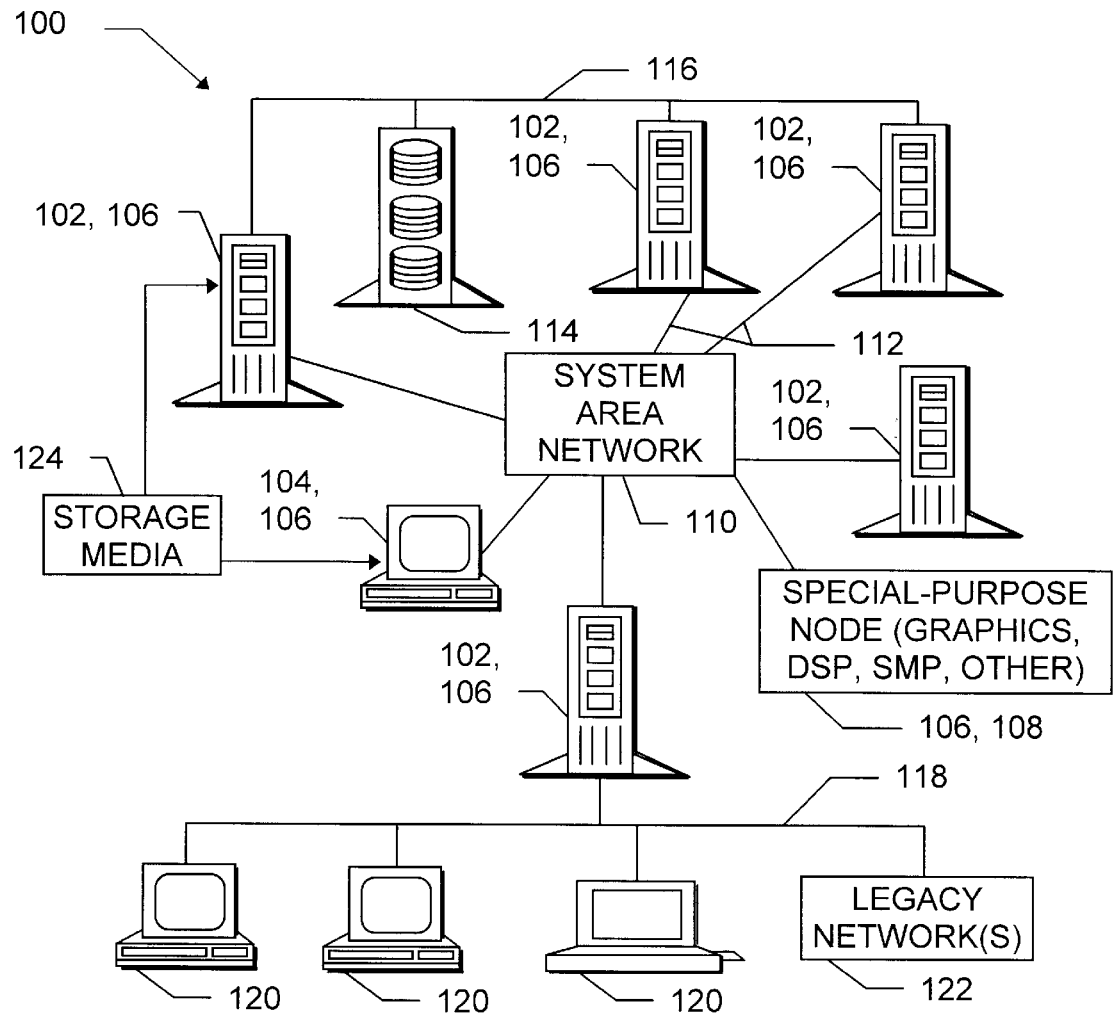
FIG. 1 is a diagram illustrating one of many clustered computer systems suitable for use according to the present invention.

One of many possible clusters suitable for use according to the invention is shown in FIG. 1, as indicated by the arrow labeled 100. The cluster 100 includes several servers 102 and a workstation node 104; other suitable clusters may contain other combinations of servers, workstations, diskless computers, laptops, multiprocessors, mainframes, so-called "network computers" or "lean clients", personal digital assistants, and/or other computers as nodes 106.

The illustrated cluster 100 includes a special-purpose node 108; other clusters may contain additional such nodes 108 or omit such nodes 108. The special-purpose node 108 is a computer tailored, by special-purpose hardware and/or software (usually both), to perform particular tasks more efficiently than general purpose servers 102 or workstations 104. To give but a few of the many possible examples, the node 108 may be a graphics engine designed for rendering computer-generated images, a digital signal processor designed for enhancing visual or audio signals, a parallel processor designed for query or transaction processing, a symmetric multiprocessor designed for molecular modeling or other numeric simulations, or some other special-purpose computer or computer system (the node 108 could itself be a cluster which is presently dedicated to a specific application).

Although clusters are typically formed using standalone computers as nodes 106, embedded computer systems such as those used in automated manufacturing, process control, real-time sensing, and other facilities and devices may also serve as nodes 106. Clusters may also include I/O systems, such as printers, process controllers, sensors, numerically controlled manufacturing or rapid prototyping devices, robots, other data or control ports, or other interfaces with the world outside the cluster. The nodes 106 communicate through a system area network 110 using interconnects 112. Suitable interconnects 112 include Scalable Coherent Interface (LAMP) interconnects, serial express (Scilite), asynchronous transfer mode, HiPPI, Super HiPPI, FibreChannel, Myrinet, Tandem ServerNct, and SerialBus (IEEE 1394/ "FireWire") interconnects (marks of their respective owners). The system area network 110 includes software for routing, switching, transport, and other networking functions. Software implementing the claimed invention may be integrated with the preexisting system area network 110 functionality or it may be implemented separately.

The illustrated cluster also includes a shared disk array 114, such as a redundant array of disks. Other cluster embodiments include other shared nonvolatile storage such as uninterruptible-power-supply-backed random access memory or magnetic tapes. At least two servers 102 have access to the shared disks 114 through a channel 116 which does not rely on the interconnects 112 to operate.

One or more servers 102 may connect the cluster to a network 118 of workstations or mobile clients 120 and/or connect the cluster to other networks 122. The networks 118 and 122 are legacy networks (as opposed to system area networks) which may include communications or networking software such as the software available from Novell, Microsoft, Artisoft, and other vendors, and may operate using TCP/IP, SPX, IPX, and other protocols over twisted pair, coaxial, or optical fiber cables, telephone lines, satellites, microwave relays, modulated AC power lines, and/or other data transmission "wires" known to those of skill in the art. The networks 118 and 122 may encompass smaller networks and/or be connectable to other networks through a gateway or similar mechanism.

As suggested by FIG. 1, at least one of the nodes 106 is capable of using a floppy drive, tape drive optical drive, magneto-optical drive, or other means to read a storage medium 124. A suitable storage medium 124 includes a magnetic, optical, or other computer-readable storage device having a specific physical configuration. Suitable storage devices include floppy disks, hard disks, tape. CD-ROMs, PROMs, random access memory, and other computer system storage devices. The physical configuration represents data and instructions which cause the cluster and/or its nodes to operate in a specific and predefined manner as described herein. Thus, the medium 124 tangibly embodies a program, functions, and/or instructions that are executable by computer(s) to assist cluster resource management substantially as described herein.

Suitable software for implementing the invention is readily provided by those of skill in the art using the teachings presented here and programming languages and tools such as Java, Pascal, C++, C, CGI, Perl, SQL, APIs, SDKs, assembly, firmware, microcode, and/or other languages and tools.

Cluster Nodes

Figure 2:
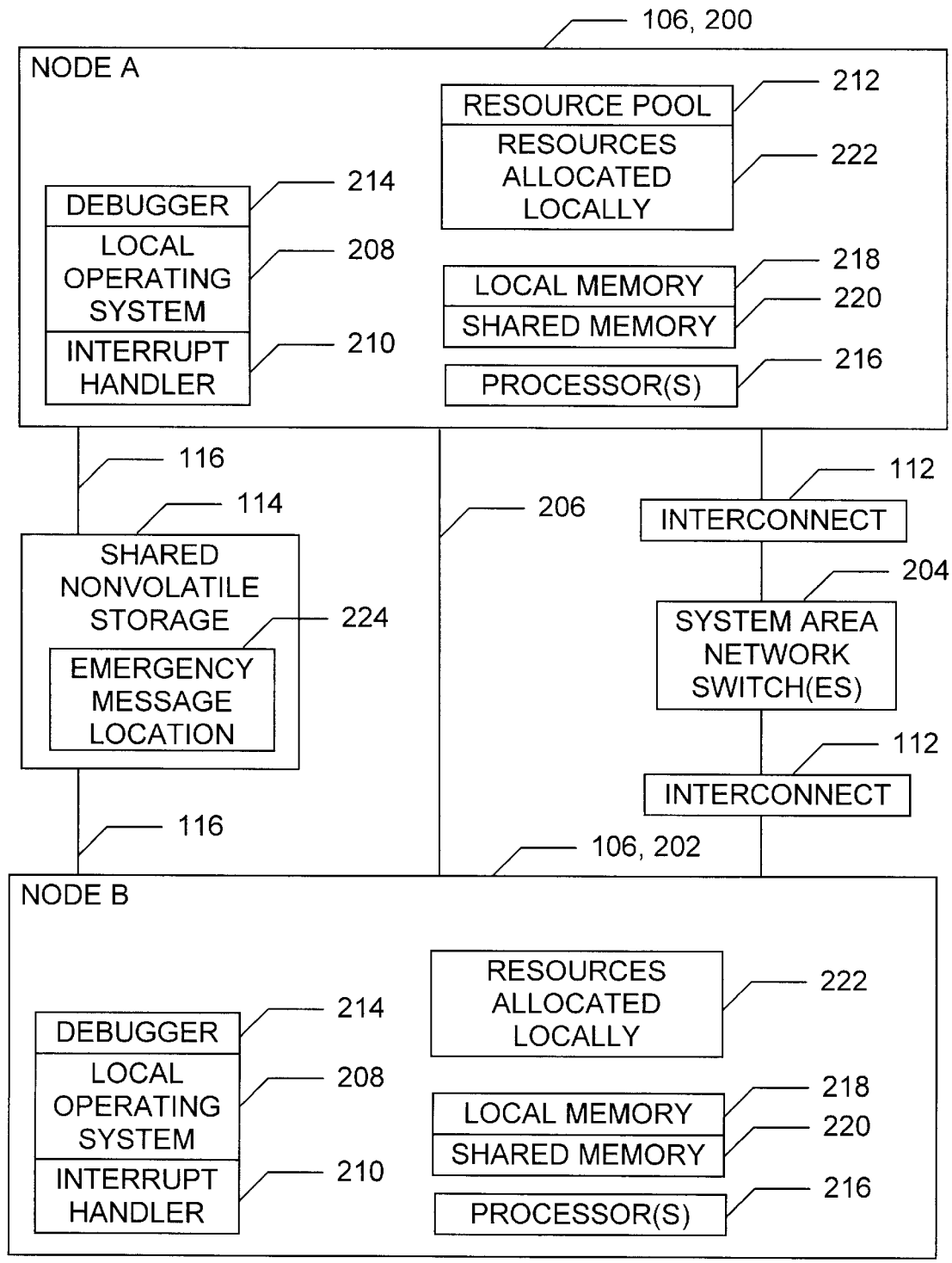
FIG. 2 is a diagram further illustrating two nodes in a cluster according to the invention.

An overview of two cluster nodes 200, 202 and their immediate environment is now given with reference to FIG. 2. The nodes 200, 202 are interconnected by interconnects 112 and one or more system area network switches 204. Suitable interconnects 112 and switches 204 include commercially available devices from Dolphin, Tandem, Myricom, and other suppliers, including without limitation devices described in materials filed with the Patent Office in connection with this application.

In the illustrated cluster, the nodes 200 and 202 are also connected by a backup link 206 such as an RS-b 232 link, an Ethernet, or another local area network. The relatively low bandwidth and/or high latency of the backup link 206 in comparison to the system area network 112, 204 requires that use of the backup link be infrequent; the backup link 206 is typically used only in emergencies such as a failure of the system area network interconnection. In such emergencies, familiar protocols are used to avoid "split-brain" problems that damage or destroy data on the shared disk 114.

Other clusters do not include the backup link 206. Indeed, as explained below, the present invention provides a substitute for the backup link 206 in the form of an emergency communication channel using the shared disk 114. However, the inventive emergency communication channel may also be used to advantage in clusters 100 that include a backup link 206, to provide additional redundancy in communication paths.

As discussed below, each of the illustrated nodes 200, 202 includes software, hardware in the form of processors and memory, and sharable resources which have been allocated to the node. Node A 200 also contains a pool 212 of resources which are not presently allocated.

The node 106 software includes a local (to the node) operating system 208 such as Novell NetWare, Microsoft Windows NT, UNIX, IBM AIX, Linux, or another operating system (NETWARE is a mark of Novell; WINDOWS NT is a mark of Microsoft; other marks belong to their respective owners). Interrupt handlers and vectors 210 are part of the operating system 208 and/or provided in loadable modules, drivers, exception handlers, or similar low-level routines. Many of the interrupt handlers 210 are standard, commercially available components. However, the interrupt handlers 210 may also include routines implemented according to the present invention for managing a pool 212 of sharable resources such as memory buffers or bandwidth credits.

The illustrated node 106 software also includes a debugger 214. Cluster 100 debuggers will generally be more complex than debuggers on standalone computers. For instance, it may be desirable to kick every node 106 into debugging mode when one node 106 enters that mode. For this reason, and for convenience, the debuggers 214 on separate nodes 106 preferably communicate with one another, either through the system area network switch 204, the backup link 206, or the emergency communication channel of the present invention.

Each node 106 includes one or more processors 216. Suitable processors include commercially available processors such as Intel processors, Motorola processors, Digital Equipment processors, and others. For purposes of the present invention, the processors 216 may include PALs, ASICs, microcoded engines, numeric or graphics coprocessors, processor cache, associated logic, and other processing hardware and firmware.

Each node 106 also includes local memory 218 for storing data and instructions used and manipulated by the processors, including data and instructions for the software described above or elsewhere herein. The local memory may include RAM, ROM, flash memory, or other memory devices. The illustrated nodes 200, 202 also include shared memory 220 which is accessible by other nodes 106. Other cluster 100 configurations place all shared memory on a single node 106, or in a separate device which supports memory transfers but lacks a processor 216.

Each of the illustrated nodes 106 also contains resources 222 which have been allocated to the node 106 from the resource pool 212. As noted, the allocated resources may be memory buffers (residing in shared memory 220); credits toward bandwidth, priority or other scarce cluster 100 resources, or any other computational resource which it is more cost-effective to share among nodes than it is to dedicate permanently to each node. By contrast, the processors 216 and interconnects 112 are typically dedicated rather than pooled. At other times during execution of instructions by the nodes 106, one or both the illustrated nodes 106 might have returned the resources to the pool 212. In other clusters 100, the pool 212 and/or associated structures that manage the allocation could also be distributed among several nodes 106 instead of residing on a single node 200.

Resource Management Generally

The processors 216, memories 218 and 220, sharable resources 212 and 222, shared disk 114, backup link 206 (if any), and other cluster components are resources that must be efficiently managed to make clusters cost-effective. Good cluster resource management includes methods and tools for (a) detecting failures, (b) compensating for failures, and (c) reallocating sharable resources between nodes 106 when cluster membership or other circumstances change significantly.

For instance, maximizing availability of the cluster's resources to application software requires (a) rapid detection of inter-node communication problems, (b) rapid and accurate diagnosis of the source of such a problem, and (c) rapid compensation steps to either restore the system area network or else remove a node when it can no longer be reached through the network. When a node is removed from working membership in the cluster, the node's access to the shared disk 114 must be blocked to prevent the removed node from destroying data. Sharable resources 222 allocated to the removed node should also be returned to the pool 212.

Likewise, when a node 106 is restored to membership in the working cluster 100, or when a node 106 is first added to the cluster 100, resources must be managed appropriately. The rest of the cluster 100 must be notified of the new node 106 so the other nodes 106 can detect any subsequent failure of the new node 106. The new node 106 must typically be given access to the shared disk 114 and a chance to request sharable resources 222 from the pool 212.

Moreover, during the course of normal operation, both new nodes 106 and other nodes 106 must be capable of obtaining or returning sharable resources 222 as needed to perform their assigned tasks and allow the other nodes 106 to perform their assigned tasks. For instance, memory buffers 222 that are no longer needed should be promptly returned to the pool 212, without interfering, with nodes 106 that are busy on tasks that don't use buffers 222.

Various aspects of resource management are discussed in greater detail below, including failure detection and diagnosis, compensation for inter-node communication failures. and reallocation of sharable resources. Embodiments and processes according to the present invention may include any or all of the novel improvements presented here.

Failure Detection and Diagnosis

One conventional approach to failure detection includes broadcasting a heartbeat signal; in effect each node continually tells the other nodes (or a cluster manager node) "I am still running." When a predetermined time passes without another heartbeat signal arriving, the node whose heartbeat is missing is presumed to have failed. Another known approach monitors a remote interconnect register; during normal operation the register's value is regularly changed. When a predetermined time passes without a change in the register value, the software on the associated remote node is presumed to have failed.

Unfortunately, these conventional methods provide little or no helpful information with which to diagnose the nature and cause of communication problems. The heartbeat signal may not arrive because the sending node suffered a software failure, because it suffered a hardware failure, because it was placed in debugging mode (which slows or temporarily stops execution), or because one or more of'the interconnects or system area network switches failed. More than one of these causes may also be present.

Figure 3:
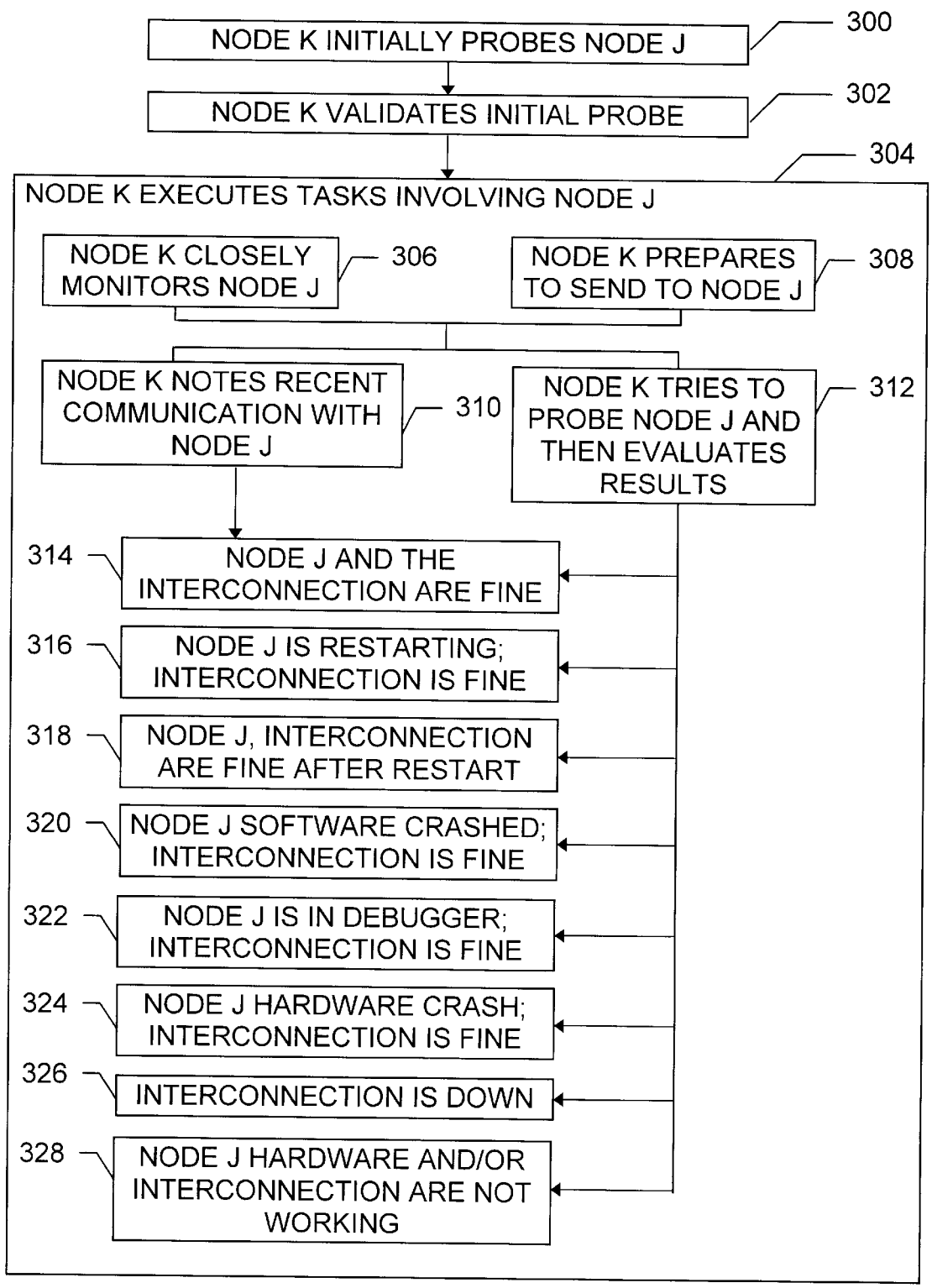
FIG. 3 is a diagram illustrating method steps performed and results obtained for failure detection and diagnosis according to the invention.
Figure 4:
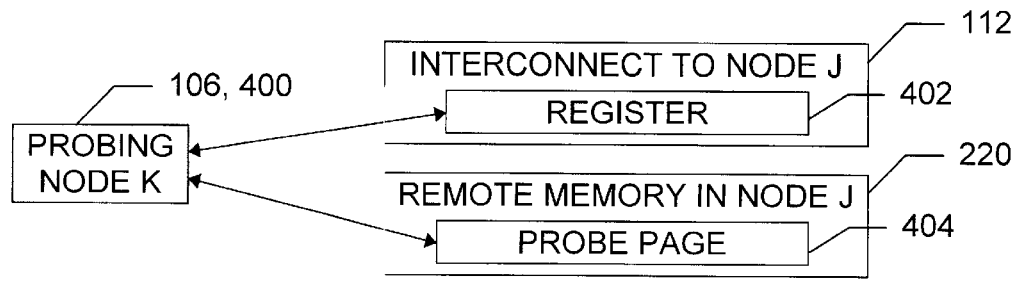
FIG. 4 is a diagram relating the method of FIG. 3 to the nodes in FIG. 2.
Figure 5:
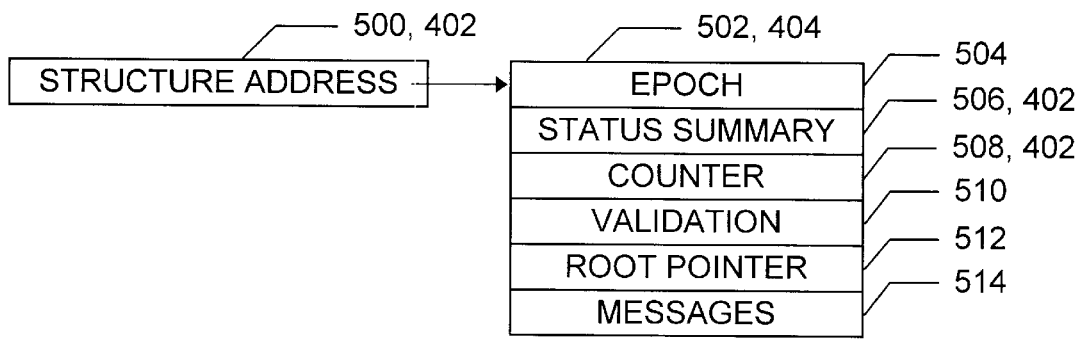
FIG. 5 is a diagram illustrating structures used by the method of FIG. 4.

FIGS. 3 through 5 illustrate an approach to failure detection and diagnosis provided by the present invention. The invention makes specific diagnosis of problems easier and more accurate, thereby promoting rapid and correct compensation by the cluster 100 when a communication failure occurs.

During an initial probing step 300, a first node 106, 400 (denoted K) probes remote memory located in a second node 106 (denoted J) in an attempt to obtain initial values from a probe structure. Suitable probe structures, which are discussed below, include without limitation a register 402, word, byte, or other addressable memory location and/or a structure 502 residing in several addressable memory locations. The probing step 300 generally supplies the probing node 400 with a copy of the value stored in the remote memory location(s) probed, such as remote registers 402 or memory pages 404. In one embodiment, the retrieved value merely contains a counter value 508 or other value which is regularly updated by the remote node 106, interconnect 112, or other probed device so long as that probed device is operating normally.

However in other embodiments the retrieved value contains more than just the counter value 508. For instance, the retrieved value may include a validation component 510. The validation 510 is used during a validating step 302 to reduce the risk that the counter value 508 is not valid. For instance, in devices whose memory on startup contains random values, the validation may be set to an unusual value (such as all zero bits or all one bits) after the counter value 508 is properly set by the device being probed. In devices whose memory is initialized on startup (by being zeroed, for instance) validation 510 may be set to a value other than the initial value. Alternatively the validation 510 may be a checksum computed from the counter value 508 and/or based on the value of other components of the probe structure 502.

If the validating step 302 does not find a valid checksum or other validation of the counter 508, then the probing node 106 proceeds on the assumption that the probed device is presently unavailable. Retry loops can then be made. If a valid counter 508 is not available, the probing node 400 proceeds on the assumption that the probed device is not available. Conclusions can be drawn about the cause of the unavailability using a process similar to that described below in connection with a normal operating step 304.

During the step 304, the probing node 400 performs tasks which may require communication with the probed node. For clarity of illustration, only those aspects of the tasks that involve detecting and diagnosing failures to communicate with node J are shown. Two basic approaches to failure detection are possible, as indicated by steps 306 and 308, respectively.

As indicated by step 306, the probing node 400 may closely monitor node J or another device such as an interconnect 112 or system area network switch 204, regardless of whether the probing node 400 and the probed device need to send computational results back and forth. That is, the probing node K may serve as a "watchdog" to detect failures as rapidly as possible. The probe structure update interval and the monitoring interval should be staggered, such as being twice and thrice some interval T, to avoid false conclusions. One suitable T is 0.5 seconds. Such a watchdog approach could be used, for example, in a real-time sensory data gathering cluster 100 when communications between the two nodes 106 are critical but also relatively infrequent, allowing time for most problems to be fixed if they are detected quickly enough.

On the other hand, the probing node 400 may take the approach indicated by step 308 and probe the device to determine its status only when the probing node 308 is ready for data or control information to move between it and the probed device. This approach reduces use of the system area network 110 by remote memory probes, freeing bandwidth and possibly also processors 216 to perform other work.

Regardless of whether step 306, step 308, or some mixture of the two steps is used, assume now that the probing node 400 needs to determine whether it can still communicate with the remote device. In one embodiment, the probing node 400 assumes during a step 310 that communication is still possible if the probing node 400 communicated with the device not long ago. That is, the cluster 100 includes resource management means for remotely probing memory in a device (such as a remote node 106, an interconnect 112, or a switch 204) when a most recent communication with the device occurred more than a predetermined period of time in the past.

The length of the predetermined period necessarily varies between clusters 100, and may vary within a given cluster 100 in response to changing circumstances. Using a longer duration increases the risk of a "false positive, " that is, of concluding that communication is still possible when it actually is not. The duration used will normally be orders of magnitude less than the mean time between failure of the communications path in question. In general, the duration used should also be less than the time needed to reroute the data to another destination or recapture the data that was lost because the communications failed. It may also be appropriate to reduce the duration used based on the size of the remote device's buffers and the rate at which it receives or produces data to be sent to the probing node 400.

If communication between the probing node 400 (or another probing device) and the remote device is not recent enough, then the probing node 400 tries during step 312 to probe the device's memory to obtain a copy of at least the counter 508, and to receive copies of any other probe structure 502 components present in the embodiment. Attempts to probe remote memory during steps 300 and 312 may invoke different routines for different devices, but a uniform interface such as an application program interface ("API") call is also possible. One suitable API includes two functions which return results from a predefined set of outcomes, as shown in the following pseudocode:

```
ProbeGet( LONG RemoteDeviceId, PROBE* ProbePtr) returns
ProbeResult;
ProbeSet( LONG RemoteDeviceId, PROBB* ProbePtr ) returns
ProbeResult;
Enumerated type ProbeResult is {
    RESULT_SUCCESS, // successful call
    RESULT_BADARG, // bad argument
    RESULT_NOMEM, // no memory for operation
    RESULT_INUSE, // port or item already in use
    RESULT_UNKNOWN, // reference to unknown item
    RESULT_UNREACHABLE, // target node unreachable
    RESULT_LINKDOWN, // interconnect link is down
    RESULT_FAILURE // general failure
};
```

As indicated by results 314 through 328, the present invention provides detailed information regarding the cause of communication failures. For instance, if the ProbeGet( ) call or other remote memory read is successful and the counter 508 is validated by the validation field 510 and the counter 508 value read differs from the last value read (during step 300 or a previous step 312), then the likelihood is high that both the remote device or node and the intervening interconnect(s) are working. That is, condition 314 holds.

However, it may happen that the remote memory read is successful but the counter value 508 is not valid. This could indicate either condition 320 (node software has crashed) or condition 316 (node operating system 208 is rebooting and/or node applications software is restarting). To distinguish between these conditions, one embodiment uses a bitflag or other status values in a status summary 506. The bitflag is set when the software is about to restart/reboot, and is cleared otherwise.

Some embodiments also include an epoch value 504 which is incremented (or decremented) by each restart/reboot. This allows the probing node 400 to distinguish between conditions 314 and 318, that is, between a valid counter 508 set during the previous software execution on the remote device and a valid counter 508 set during the current execution. Overly frequent reboots or restarts may be worth investigating even if communication is eventually possible, because they tend to reduce cluster 100 availability and efficiency.

In some embodiments, the debugger 214 sets status bits 506 when it is invoked. This allows the probing node 400 to detect condition 322 (remote device in debugging mode) by determining that the remote memory read succeeded, the probe structure 502 was validated by the field 510, and the debugger flag 506 is set. This condition may then be propagated, so that when one node 106 is forced into the debugger by an overflow, illegal address, abend, or similar problem, that fact is rapidly detected and the other cluster nodes are asked (or forced) to also yield control to their respective debuggers 214.

In each of the preceding examples, the attempt to read remote memory succeeded in retrieving a value from that memory. However, if one or more of the interconnections 112 or system area network switches 204 or hardware within the remote device fails, then the remote memory will often be inaccessible, making the remote memory's contents unavailable. Some embodiments include hardware that allows the ProbeGet( ) call or other remote memory read to distinguish between reading a value from memory and failing to read a value from memory. Thus, the probing node 400 may detect conditions 324 through 328 (some type of hardware failure).

To localize the hardware failure, additional attempts may be made to read remote memory from different devices in the communication path. as illustrated in FIG. 4. For instance, if a register 402 (containing a counter 508 or containing some other value) can be read but a page 404 of shared memory 220 in the remote node 106 cannot be read, then condition 324 (node hardware crashed but interconnect works) is likely. If the interconnect register 402 cannot be read, then either condition 326 (interconnect failed) or condition 328 (interconnect and/or node failed) is present. By checking for continued activity by the remote node 106 through a different communication channel, such as the backup link 206 or the shared disk 114, the probing node 400 may determine either that the interconnect 112 and remote node 106 have both crashed or that the interconnect 112 is down but the remote node 106 is still running.

In addition to the information already discussed, a remote memory read may provide additional data, as shown in FIG. 5. A root pointer 512 may direct the probing node 400 to bootstrapping information to allow a remote reboot of the failed node 106 or failed device, with the reboot being aided or initiated by the probing node 400. A root pointer 512 may also allow a booting node to locate communications buffers in a remote node in order to establish higher level communication. A root pointer 512 may also be used to allow a booting node to download code from another node 106 that is already running. More generally, the root pointer 512 may point to boot code or to a communications buffer.

The status summary 506 and/or a separate message area 514 may contain diagnostic information such as debugging traces, the call chain, the ID of the last thread or task invoked before the remote device or remote node 106 failed (in effect, identifying the node's "killer"), error messages, load module maps, system usage statistics, or communication logs. This information may prove very helpful in determining the cause of failures (especially software failures) and selecting steps to compensate for the failure. Possible compensating steps include cutting the node Out of the cluster until an administrator puts it back in, rebooting the node, restarting a particular task or thread, creating a certain file or directory or loading certain code and then retrying the operation, and so on; which steps should be tried depend on the likely cause of the failure.

Although specific examples are given, those of skill will appreciate that various combinations of the illustrated elements are also possible. For instance, the method steps illustrated and discussed here may be performed in various orders, except in those cases in which the results of one step are required as input to another step. Likewise, steps may be omitted unless called for in the claims, regardless of whether they are expressly described as optional in this Detailed Description. Steps may also be repeated, or combined, or named differently. As a few of the many possible examples, some embodiments omit step 310, and some have every node probe every other node while others have only designated monitor nodes do the probing.

Likewise, some embodiments group the conditions differently. For instance, one tracks restarts using epoch values 504 but does not distinguish interconnect 112 hardware failures from remote node 106 hardware failures. Another embodiment reads hardware status registers to obtain more detail regarding hardware failures, such as distinguishing between a loss of power and a loss of signal connection.

As shown in FIGS. 4 and 5, different embodiments also organize the remote memory probe structures in different ways. Some use a read-only register or two while others use RAM that is both remotely readable and remotely writable. Some read the counter 508 directly while others follow an address pointer 500 or additional levels of indirection. Some use only a few bytes or words of memory while others dedicate an entire block or page (probably one having identical physical and logical addresses). Some use all the fields shown in FIG. 5, while others use only a counter 508, or only a counter 508 and validation checksum 510, or some other subset of the fields shown, or supplement the subset with additional information. Some embodiments probe both the interconnect 112 and the remote node 106, while others probe only the interconnect 112 or only the remote node 106; yet others also probe the system area network switches 204.

In each embodiment, however, the remote memory probe provides useful information about the nature and/or location of a cluster 100 component failure, which can be used to select between different compensating steps. This in turn promotes cluster availability and effectiveness.

Failure Management by Node Removal

A "split brain" occurs when regular communication with one or more interconnect 112 and/or switch 204 failures prevent communication with one or more nodes 106 and there is a significant risk that the silent nodes 106 will corrupt or damage data on the shared storage 114. Determining whether it is necessary to "freeze out" or "fence off" (temporarily remove) the silent node(s) 106 and/or block their access to the shared storage 114 is faster and easier if an alternative communication path to the silent node(s) is available. Many clusters use the backup network or serial/parallel link 206 as such as path.

To avoid the expense, complexity, and maintenance requirements of using the backup link 206. some embodiments according to the present invention use the shared disk 114 as an alternative communication path during possible split brain episodes and/or other situations in which the system area network 110 is unavailable (e.g., interconnects 112 or switches 204 are down) or inappropriate (e.g., non-volatile storage is desired). In addition, some embodiments use both the backup link 206 and the shared disk 114 as communication paths, since redundancy increases overall cluster 100 reliability.

The nodes 106 in question will already have access to the shared disk 114 through channels 116. Implementing the shared disk communication path according to the invention involves selecting an emergency message location 224 on the disk 114. The location 224 may be made known to all nodes 106 by hard-coding it in node software such as the operating system 208 or interrupt handlers 210. Alternatively, the location may be dependent on some event such as the last file written by the node 106 or the most recent log entry written. Or the location may be specified in a boot sector on the disk 224.

Although the location 224 may be a partition reserved for emergency communications, this uses an entry in a partition table that may be limited to very few entries. It is therefore preferred that the location 224 be specified as a particular disk sector, a particular file, or another fixed address relative to an addressing scheme that allows at least dozens or hundreds of entries.

Figure 6:
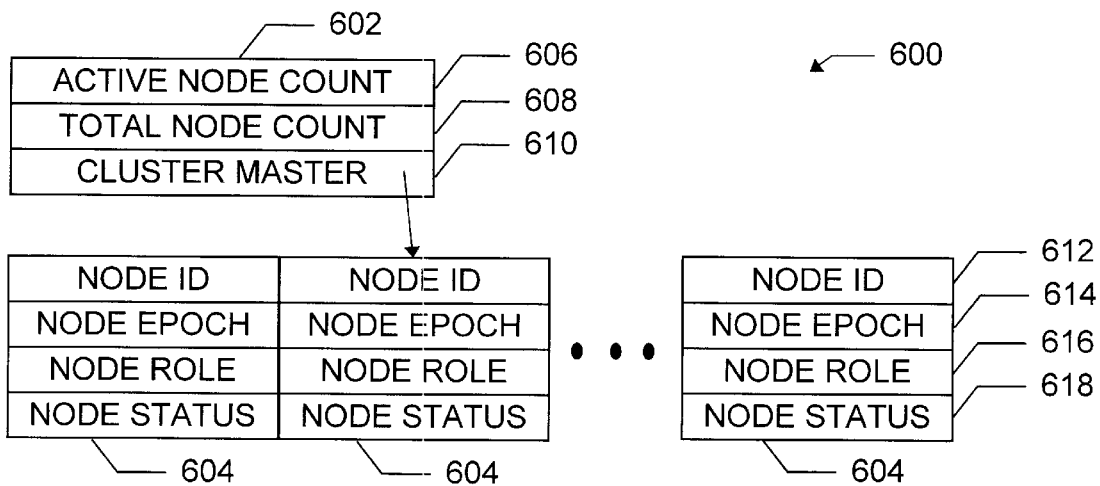
FIG. 6 is a diagram illustrating structures for using a shared disk as an alternative communication path according to the invention.

The messages stored at the location 224 may include information organized in a structure such as that indicated generally at 600 in FIG. 6. The emergency communication structure 600 may also serve as a cluster node registry 600 which is maintained during operation of the cluster 100 as nodes 106 are added, removed, or assigned to different roles. The structure 600 may be implemented as an array, linked list, doubly linked list, balanced tree, or other data structure.

The illustrated structure includes a header 602 and a collection of two or more node records 604. The header 602 includes a field specifying the number of currently active nodes 606, active nodes are those running and in normal communication with the rest of the cluster 100. Another field specifies the number of total nodes 608, that is, the maximum number of active nodes in the current hardware configuration.

A cluster master field 610 identifies the node that is currently responsible for coordinating node removal in the event of a split brain event. The cluster master node 106 may also be responsible for monitoring the other nodes using remote memory probes as discussed above, or using conventional heartbeat monitoring. Alternatively, all nodes may monitor one another, or each node may monitor only the nodes it communicates with.

Each of the illustrated node records 604 includes a node ID 612, such as a node system area network address, node table index, node name, or other identifier. An epoch field 614 indicates the number of times the node 106 in question has rebooted since the cluster 100 started running; the epoch 614 may also track transaction rollbacks, application program restarts, or other retry indicators. A node role field 616 indicates whether the node 106 in question is suitable for service as a cluster master, whether the node 106 includes special purpose features such as a graphics engine, and/or whether the node 106 serves as the primary interface to users or I/O devices. A node status 618 field may contain status and diagnostic information of the type discussed in connection with FIGS. 3 through 5.

In other embodiments, the communication structure 600 may omit some of the illustrated fields and/or contain other fields. For instance, a semaphore or mutex may be present to synchronize updates to the structure 600; a checksum or other validation field may be present; and bootstrapping information of the kind discussed in connection with FIG. 5 may be present.

In operation, the structure 600 at the emergency message location 224 is used by the cluster master and the other nodes 106 to coordinate their actions when communication through the system area network 110 is prevented. The coordination may include setting status 618 flags that order a silent node to stop accessing the application area on the shared disk 114, to shut a certain task down, to enter the debugger 214, and/or to shut itself down (node "poison pill"). Coordination may include reassigning the role of cluster master if the cluster master goes silent.

The structure 600 may also be used by the cluster master and/or debuggers 214 to maintain a persistent store of diagnostic information, such as epoch counts 614, task IDs, stack snapshots, memory dumps, and the like, in a location that is accessible to the other nodes 106 in the cluster. Indeed, the remote memory probes discussed above in connection with FIGS. 3 through 5 may be mirrored or initially performed on embodiments of the structure 600 which include fields such as those shown in FIG. 5.

Resource Reallocation

Methods and tools for mediating requests for sharable resources 222 from a global pool 212 are well-known, the available tools and methods include those for preventing deadlock, for load-balancing, for scheduling, and for cache management, among others. The present invention provides a new approach to performing reallocation once the cluster 100 has determined where the resources 212, 222 should be placed. One illustration of reallocation according to the invention is shown in FIGS. 7 and 8.

Figure 7:
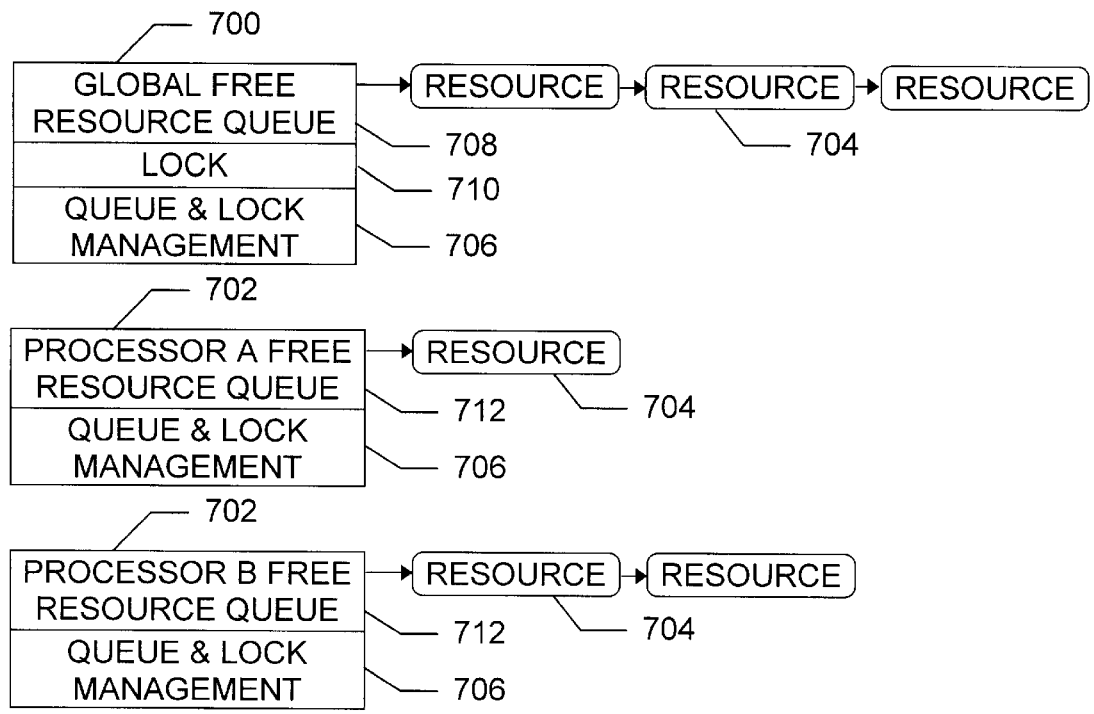
FIG. 7 is a diagram illustrating queues and related components for managing allocation of resources according to the invention.

As shown in FIG. 7, the cluster 100 includes a global queue 700 and several local queues 702 identifying free resources 704; "free" in this context means "available for allocation" rather than "without cost." A queue and lock management means 706 controls access to the global queue 700 using a head pointer 708 pointing to a linked list of resources 704 and a lock 710. Of course, a global group and corresponding local groups of arrays, doubly-linked lists, trees, and other structures may be used in place of the linked lists shown to manage the sharable resources 704. The queue and lock management means 706 controls access to the local queues using head pointers 712 and interrupt handlers 210. Suitable locks 710 include mutexes, semaphores, and other concurrent process synchronization tools, including many which are familiar to those of skill in the art. One implementation of the queue and lock management means 706 using a mutex and interrupts is described by pseudo-code below.

Figure 8:
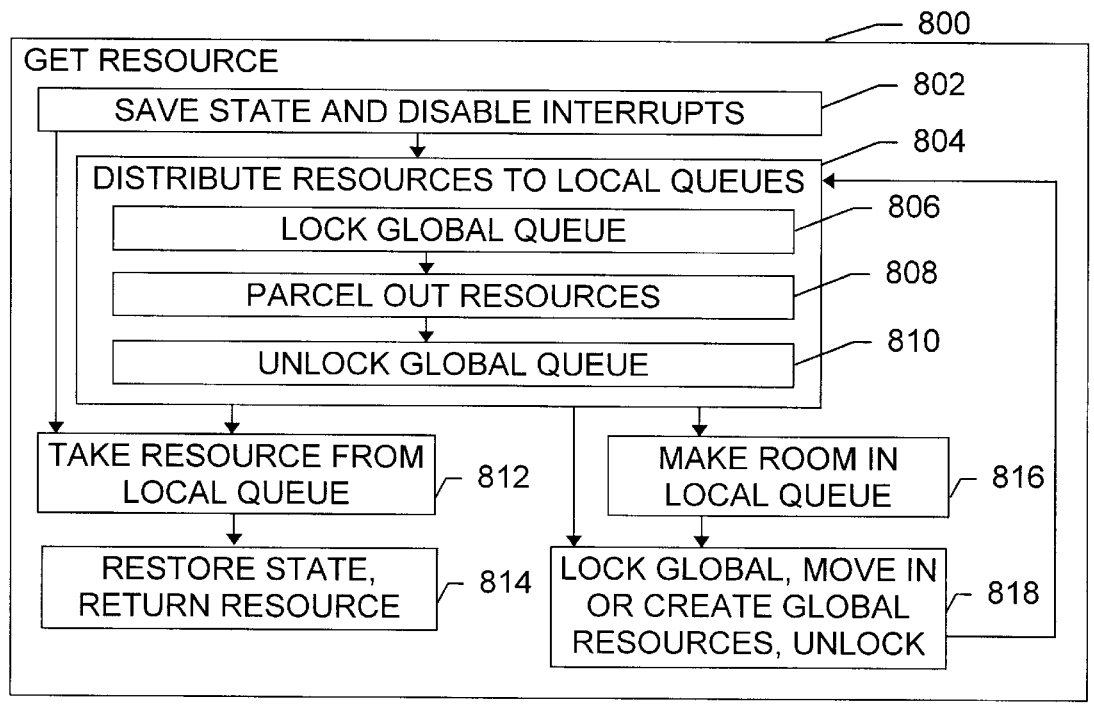
FIG. 8 is a flowchart illustrating a method for managing resource allocation according to the invention.

FIG. 8 further illustrates a portion 800 of the queue and lock management means 706, corresponding to the routine Getbuffer( ) in the pseudo-code. During an interrupt disabling step 802, interrupts on a node 106 are disabled and the processor 216 state is saved. This is accomplished using push status word and clear interrupt or similar assembly language instructions. If the local queue 702 from which a resource 704 is being requested is empty, as will be the case the first time through the routine 800 and thereafter on occasion, then a step 804 attempts to distribute resources 704 to this (and possibly other) local queues 702 from the global queue 700. Distribution includes obtaining the lock 710 during a step 806, parceling out the resources 704 during a step 808, and then releasing the global queue lock 710 during a step 810.

If resources 704 are available in the local queue 702 in question, then one or more resources 704 are removed from the local queue 702 during a step 812. The resource(s) 704 are then given to the calling application or other process after the processor state is restored and interrupts are re-enabled, during a step 814. This is accomplished using pop status word, set interrupt and/or similar assembly language instructions, and by passing a pointer to the released resource(s) 704 to the caller as a return value on the stack. Of course, the pointer could also be placed in shared memory or returned in another manner. Resources 704 which are represented compactly, such as bandwidth credits in some clusters 100, may be returned directly rather than being returned through a pointer.

As used herein, "interrupt handler" means code that runs while an interrupt is disabled. Interrupt handlers in this sense are not limited to device drivers. Interrupts are not necessarily re-enabled when processor state is restored, because they may have been disabled when the interrupt handler took control.

Prior to initialization and after resource demands are placed, the global queue 700 may be empty. In this event, an optional step 816 makes room for more resources 704 in the global queue 700 by allocating memory, for example, or by negotiating with a bandwidth credit allocation manager. If there is room in the global queue 700, resources 704 are added to the global queue 700 during a step 818. The new resources 704 may be effectively created in place, as during allocation of memory buffers 704, or they may be moved into the global queue 700 from another location. In particular, resources 704 may on occasion be moved into the global queue 700 from one or more of the local queues 702.

The ReturnBuffer( ) routine in the pseudo-code, and similar portions of other embodiments of the queue and lock management means 706, operate in a manner similar to GetBuffer( ) and the Get Resource step 800. However, ReturnBuffer o and its variations return resources 704 to the local queue 702 after the resources 704 are no longer needed by an application program or other software on a node 106. In particular, resources 704 are preferably returned to the local queue 702 when the application dies or is killed. Resources 704 are preferably returned to the global queue 700 when a node 106 is removed from the cluster 100 to avoid split brain problems or to free the node 106 for use in another cluster 100 or as a standalone computer. In such cases, access to the local queue 702 is through the interrupt handler 210 and access to the global queue 700 is controlled by the lock 710.

One advantage of the present invention is reduced use of locks, which in turn reduces the frequency and extent of processor 216 execution delays. Only the global queue 700 requires a mutex or similar global lock 710. The local queues 702 are manipulated inside interrupt handlers 210 that are local to the node 106 to which the local queue 702 in question belongs. Thus, operations which can alter the local queues 702 (such as the addition or removal of resources 704 or the reordering of the queue 702 or updates to timestamps on resources 704) only prevent other processes from working on the node 106 in question; the other nodes 106 can continue application or other tasks without delay. Only when the global queue 700 is being modified is access globally blocked. Reducing lock usage improves cluster 100 throughput. Allocation and return are also independent. That is, a resource 704 allocated by one processor 216 may be returned for subsequent use by another processor 216.

Although one embodiment of the invention provides each processor 216 with its own local resource queue 702, in other embodiments some processors 216 have no resource queue 702. In some embodiments, a local queue 702 is associated with a set of processors 216 rather than a single processor 216, with a set of processes or tasks or threads, and/or with a set of one or more cluster nodes 106.

Heuristics are also used during the parceling out step 808 and/or the resource creation step 818 to determine actual and expected resource 704 allocation. One approach uses thresholds such as the number of resources 704 and/or the number of processors 216. For instance, any local queue 702 containing more than twice its percapita share of the available resources 704 may be required to return resources to the global queue 700 for subsequent redistribution to other local queues 702. Time thresholds may also be used. For instance, resources 704 not allocated to an application program within a minute of being created may be freed from the global queue 700 back to the operating system 208.

In one embodiment, the cluster 100 uses means and methods described in the following pseudo-code as part of the queue and lock management code 706 to manage resources 704 in the form of dynamic buffers:

```
/* -------- DATA DECLARATIONS --------*/
/* Maximum number of processors in this machine */
#define MAXIMUM_NUMBER_OF_PROCESSORS 4
/* Maximum number of Buffers allowed ever */
#define MAXIMUM_NUMBER_OF_BUFFERS_POSSIBLE 5000;
/* Number of buffers you want to leave in global queue
    when allocating all the buffers among the Local Queues. */
#define RSVD_NUMBER_BUFFERS       10
/* Number of buffers to add to a queue at one time */
#define NUMBER_ADD_BUFFERS        10
/* Generic Buffer */
typedef struct _buff_t {
    struct _buff_t *nextLink;
    struct _buff_t *prevLink;
    uint8 buffer[1024];
} buff_t;
/* Generic Mutual Exclusion Variable */
typedef mutex_t mutex_t;
/* MUTEX which controls access to Global Free Queue */
mutex_t *buff_FreeQueue_Lock = NULL;
LONG    buff_FreeQueue_TotalCount 0; /* Total # of buffers allocated (global) */
LONG    buff_FreeQueue_Count = 0; /* Current # of free buffers (global) */
LONG    buff_FreeQueue_MaxLocalCount = 0; /* Max # of buffers per local queue */
/* Global Buffer Queue, Head / Tall Pointers */
buff_t  *buff_FreeQueue_Head = NULL;
buff_t  *buff_FreeQueue_Tall = (buff_t*) &buff_FreeQueue_Head;
/* Local Buffer Queues, Head/Tall Pointers indexed by number of Processors */
buff_t  *buff_FreeLocQueue_Head[MAXIMUM_NUMBER_OF_PROCESSORS];
buff_t  *buff_FreeLocQueue_Tall[MAXIMUM_NUMBER_OF_PROCESSORS];
/* -1 implies needs buffs assigned to local queue
    If buff_FreeLocQueue_Count[i] exceeds buff_FreeLocQueue_MaxCount[i]
    implies reached limit for this Processor
*/
/* Local Buffer Queues/processor, Current Count and Maximum Count */
LONG    buff_FreeLocQueue_Count[MAXIMUM_NUMBER_OF_PROCESSORS];
LONG    buff_FreeLocQueue_MaxCount[MAXIMUM_NUMBER_OF_PROCESSORS];
/* Variable size for Queue In/De creasing number dependent on number
    of Processors. If buff_FreeLocQueue_Count[i] exceeds implies return
    RSVD_NUMBER_BUFFERS to Global Queue for re-distribution */
LONG buff_FreeLocQueue_MaxCount[MAXIMUM_NUMBER_OF_PROCESSORS];
extern initlock (mutex_t *pmutex); /* Function, initialize a mutex */
extern lock (mutex_t *pmutex); /* Function, obtain a LOCK on a mutex */
extern unlock (mutex_t *pmutex); /* Function, release a LOCK on a mutex */
/*------ INITIALIZATION OF DATA QUEUES AND VARIABLES -------*/
    buff_t *buffp;
    LONG    i = 0; j = 0, NumProcs = 0, CPUsActiveMask = 0, CPUMask = 1;
            for (i=0; i < (MAXIMUM_NUMBER_OF_BUFFERS_POSSIBLE / 2); i++)
            {
        buffp = (buff_t*) Alloc (sizeof (buff_t);
        /* initialize buffer fields #/
        buffp->nextLink = NULL;
        buffp->prevLink = NULL;
        buff_FreeQueue_Tall = buffp;
        buff_FreeQueue_Count++;
        /* keep count of Total number of buffers allocated */
        buff_FreeQueue_TotalCount++;
    }
            initLock (buff_FreeQueueLock); /*   initialize Mutex */
    /* Initialize Local buff Free Queues */
    NumProcs = MAXIMUM_NUMBER_OF_PROCESSORS;
    /* Calculate the maximum number of buffers available for a local queue */
    buff_FreeQueue_MaxLocalCount = (buff_FreeQueue_TotalCount −
RSVD_NUMBER_BUFFERS) / NumProcs;
    for (i = 0; i < MAXIMUM_NUMBER_OF_PROCESSORS; i++)
    {
        buff_FreeLocQueue_Tall[i] = (buff_t*) &buff_FreeLocQueue_Head[i];
        buff_FreeLocQueue_Count[i] = 0;
        /* Set minimum value in case take Interrupt before get an
            Event that a processor has come on line */
        buff_FreeLocQueue_MaxCount[i] = RSVD_NUMBER_BUFFERS * 2;
    }
/* Now having allocated the buffers, let's parcel them out to the
        Local buffer Free Queues. */
/* get bit mask of current processors OnLine */
    GetActiveCPUMap (&CPUsActiveMask);
for (i=0; i < MAXIMUM_NUMBER_OF_PROCESSORS; i++)
    {
        if (CPUsActiveMask & CPUMask) /* increase max allowed on other local queues */
        {
```

-continued

```
              buff_FreeLocQueue_MaxCount[i] = buff_FreeQueue_MaxLocalCount;
              ReDistBuffersToLocalQ (buff_FreeQueue_MaxLocalCount, i); /* parcel out */
          }
          CPUMask = CPUMask << 1;
      }
      RegisterForEventProcessorComesOnLine (ProcStatusOnLine);
      RegisterForEventProcessorGoesOffLine (ProcStatusOfLine);
/*-------- END OF INITIALIZATION --------*/
/*-------- OPERATIONAL LIBRARY ROUTINES -------------*/
;
;LONG DisableProcessorAndSaveState (void); "C" Language syntax
;
;Disable the current processor and return its state.
;Example using x86 instructions,
;   assumes normal x86 Assembly to C calling convention
;
DisableProcessorAndSaveState   proc
      pushfd            ;place current processor state on stack
      pop eax           ;now get it in register EAX
      cli               ;disable interrupts for current processor
      ret               ;return to caller, processor state in EAX
DisableProcessorAndSaveState   endp
;
;void RestoreProcessorState (LONG state); "C" Language syntax
;
;Restore the current processor to the input state.
;Example using x86 instructions.
;assumes normal x86 Assembly to C calling convention
;
RestoreProcessorState proc
      mov eax, [esp + 4]      ;get input state from the stack
      push eax                ;place it on the stack
      popfd                   ;now get it into current processor's state
      ret                     ;return to caller
RestoreProcessorState endp
*   Name:
*       buff_t *Getbuffer (void)
*
*   Description:
*       This routine returns a buffer to be used for any of several purposes.
*
*   Values returned:
*       a pointer to a buffer, NULL reports an error
*/
buff_t *Getbuffer (void)
{
      buff_t *buffp;
      LONG flags, CPUNumber = 0, j=0;
      LONG NumLocalbuff = 0, CPUNumberOnEntry = -1, CurrAvail = 0;
      flags = DisableProcessorAndSaveState();
      CPUNumber = GetCPUNumber(); /* get the CPU running on */
      CPUNumberOnEntry = CPUNumber;
      if (buff_FreeLocQueue_Count[CPUNumber] == -1) /* test if need to alloc buffers for
1st time */
            goto DistributeLocalbuffQ; /* re-distribute buffer's to Local Queue */
GettheBuffer:
      if ( (buff_desc = buff_FreeLocQueue_Head[CPUNumber]) != NULL)
      {
            /* take it out of local free queue */
            buff_FreeLocQueue_Count[CPUNumber]--;
            buff_FreeLocQueue_Head[CPUNumber] = buff_t->nextLink;
            if (buffFreeLocQueue_Head[CPUNumber] == NULL) /* reset head & tall */
                  buff_FreeLocQueue_Tail[CPUNumber] =
                        (buff_t*) &buff_FreeLocQueue_Head[CPUNumber];
            RestoreProcessorState (flags);
            return(buffp);
      }
      /* Out of Local buffer Free Queue buffers,
            need to allocate more to the Global Queue and from there
            disperse them to the local buffer Free Queues
      */
      if ( (buff_FreeQueueCount+1) > NUMBBR_ADD_BUFFERS)
            CurrAvail = 1;
      else
            CurrAvail =0;
      if (CurrAvail)
      {
            /* buff_FreeQueue_Head/Tall has spare buffer's,
                  get them from that Queue */
```

-continued

```
            lock(buff_FreeQueue_Lock); /* get lock */
            /* test again with the LOCK in case somebody came in ahead of us */
            if ((buff_FreeQueue_Count+1) > NUMBER_ADD_BUFFERS)
            {
                ReDistBuffersToLocalQ (NUMBER_ADD_BUFFERS, CPUNumber);
                unlock(buff_FreeQueue_Lock); /* free lock */
                goto GefTheBuffer;      /* run through the allocation code */
            }
            else
                unlock(buff_FreeQueue_Lock); /* free lock */
        }
        /* buff_FreeQueue_Head/Tall out of spare buffer's,
            try to allocate some more,
            Add plus one, so ensure never hit NULL terminator case when redistribute
            since, may be here in uniprocessor case due to on empty */
        if ((buff_FreeQueue_TotalCount - (NUMBER_ADD_BUFFERS+1))
                  >MAXIMUM_NUMBER_OF_BUFFERS_POSSIBLE)
        {
            RestoreProcessorState (flags);
            return NULL);
        }
        /* Can now attempt to add NUMBER_ADD_BUFFERS buffers to the Global List */
        lock(buffFreeQueue_Lock); /* get lock */
        for (j=1;j < NUMBER_ADD_BUFFERS+1);j++)
        {
            buffp = (buff_t*) Alloc (sizeof (buff_t);
            if(!buffp) /* Out of memory */
            {
                unlock(buff_FreeQueue_Lock); /* free lock */
                RestoreProcessorState (flags);
                return NULL);
            }
            /* initialize buffer fields */
            buffp->nextLink = NULL;
            buffp->prevLink = NULL;
            buff_FreeQueue_Tail = buffp;
            buff_FreeQueue_Count++;
            /* keep count of Total number of buffers allocated */
            buff_FreeQueue_TotalCount++;
        }
        /* Have added NUMBER_ADD_BUFFERS to the Global List,
            must now distribute them to the Local buffer Free Queue
            and adjust the MAX COUNT for the Local buffer Free Queue.
        */
        buff_FreeQueue_MaxLocalCount =
            (buff_FreeQueue_TotalCount - RSVD_NUMBER_BUFFERS) /
                  MAXIMUM_NUMBER_OF_PROCESSORS;
        buff_FreeLocQueue_MaxCount[CPUNumber] += NUMBER_ADD_BUFFERS;
        /* Now distribute the buffers amongst the local queue */
        ReDistBuffersToLocalQ (NUMBER_ADD_BUFFERS, CPUNumber);
        unlock(buff_FreeQueue_Lock); /* free lock */
        goto GettheBuffer; /* run thru' the allocation code */
/* distribute buffers to Local Queue for 1st time */
DistributeLocalbuffQ:
        lock(buff_FreeQueue_Lock); /* get lock */
        if (buff_FreeQueue_Count > buff_FreeLocQueue_MaxCount[CPUNumber])
            NumLocalbuff = buff_FreeLocQueue_MaxCount[CPUNumber];
        else
            NumLocalbuff = buff_FreeQueue_Count / 2; /* take half of what's left */
        buff_FreeLocQueue_Count[CPUNumber] = 0; /* set to zero */
        if (NumLocalbuff)   /* parcel out buffer's */
            ReDistBuffersToLocalQ (NumLocalbuff, CPUNumber);
        unlock(buff_FreeQueue_Lock); /* free lock */
        goto GettheBuffer; /* run through the allocation code */
} /* end GetBuffer */
/*
*   Name:
*       void   ReturnBuffer (buff_t *returnedbuff)
*
*   Description:
*       This routine returns a previously allocated buff_t buffer
*           to the current processor's buffer pool.
*
*   Parameters in:
*       returnedbuff - has a pointer to a buffer to return to queue
*
*/
void ReturnBuffer (buff_t *pbuff)
{
```

-continued

```
      LONG flags, CPUNumber = 0, j = 0, NumLocalbuff = 0;
      buff_t buff_tmp1 = NULL, buff_tmp2 = NULL;
      flags = DisableProcessorAndSaveState();
      CPUNumber = GetCPUNumber(); /* Get Processor running on */
      if(buff_FreeLocQueue_Count[CPUNumber] == -1) /* 1st time through, need setup */
      {
            lock(buff_FreeQueue_Lock); /* get lock */
            if (buff_FreeQueue_Count > buff_FreeLocQueue_MaxCount[CPUNumber])
                  NumLocalbuff = buff_FreeLocQueue_MaxCount[CPUNumber];
            else
                  NumLocalbuff = buff_FreeQueue_Count / 2; /* take half of what's left */
            buff_FreeLocQueue_Count[CPUNumber] = 0; /* set to zero
            if (NumLocalbuff) /* parcel out buffs */
                  ReDistBuffersToLocalQ (NumLocalbuff, CPUNumber);
            unlock(buff_FreeQueue_Lock); /* free lock */
      }
      if (buff_FreeLocQueue_Tail[CPUNumber] ==
                  (buff_t*) &buff_FreeLocQueue_Head[CPUNumber])
      {
            /* place buffer as first
            buff_FreeLocQueue_Head[CPUNumber] = pbuff;
            buff_FreeLocQueue_Tail[CPUNumber] = pbuff;
      }
      else
      {
            pbuff->nextLink = buff_FreeLocQueue_Head[CPUNumber];
            buff_FreeLocQueue_Head[CPUNumber] = pbuff;
      }
      buff_FreeLocQueue_Count[CPUNumber] ++;
      pbuff->nextLink = NULL;
      pbuff->prevLink = NULL;
      /* Check if have too many buffers on Local Queue,
            if so return specific number to Global Queue. */
      if (buff_FreeLocQueue_Count[CPUNumber] >
                              buff_FreeLocQueue_MaxCount[CPUNumber])
      {
            /* Need to shed buffers to Global Queue */
            if ((buff_FreeLocQueue_Count[CPUNumber] - NUMBER_ADD_BUFFERS) > 0)
            {
                  if(buff_FreeLocQueue_Head[CPUNumber] != NULL) /* get 1st in link *I
                  {
                        lock(buff_FreeQueue_Lock); /* get lock */
                        buff_tmp1 = buff_FreeLocQueue_Head[CPUNumber]; /* get 1st in link */
                        buff_tmp2 = buff_tmp1; /* and keep it */
                        for (j = 1; j < NUMBER_ADD_BUFFERS; j++)
                              buff_tmp1 = buff_tmp1->nexLink; /* move down the link */
                        remove Number of extra elements from Link */
                        buff_FreeLocQueue_Head[CPUNumber] = buff_tmp1->nextLink;
                        buff_FreeLocQueue_Count[CPUNumber] =
                              buff_FreeLocQueue_Count[CPUNumber] - NUMBER_ADD_BUFFERS;
                        buff_tmp1->nextLink = NULL; /* terminate the Link */
                        /* add removed elements to the Global Queue */
                        buff_FreeQueue_Tail->nextLink = buff_tmp2;
                        buff_FreeQueue_Tail = buff_tmp2;
                        buff_FreeQueue_Count += NUMBER_ADD_BUFFERS;
                        if (buff_FreeLocQueue_Head[CPUNumber] == NULL) /* reset Head / Tail */
                              buffFreeLocQueue_Tail[CPUNumber] =
                                    (buff_t*) &buff_FreeLocQueue_Head[CPUNumber];
                        unlock(buff_FreeQueue_Lock); /* free lock */
                  }
            }
      }
      RestoreProcessorState (flags);
} /* end ReturnBuffer */
/*
*   Name:
*       void ProcStatusOnLine (LONG    CPUNumber);
*
*   Description:
*       Function is notified when a Processor comes ONLINE
*       which in turn calls functions to redistribute the buffers among the
*       Local buffer Free Queues based on the number of processor's
*
*   Parameters in:
*       CPUNumber   Number that identifies CPU that went ONLINE
*
*   Values returned:   none
*
void ProcStatusOnLine (LONG CPUNumber)
```

```
{
    LONG flags = 0, i = 0, CPUMask = 1;
    LONG NumProcs = 0, CPUsActiveMask = 0;
    flags = DisableProcessorAndSaveState();
    lock(buff_FreeQueue_Lock); /* get lock */
    /* Set Local Queue Parameters */
    buff_FreeLocQueue_Tail[CPUNumber] =
                (buff_t*) &buff_FreeLocQueue_Head[CPUNumber];
    buff_FreeLocQueue_Head[CPUNumber] = NULL;
    /* set counter to no buffers alloc'd for Local Queue yet */
    buff_FreeLocQueue_Count[CPUNumber] = -1;
    /* Now update max allowed for Local Free buffer's queue based on
        equal share of all buffers allocated for Global queue
        buff_FreeQueue_Head/Tail so far. */
    NumProcs = MAXIMUM_NUMBER_OF_PROCESSORS;
    buff_FreeQueue_MaxLocalCount =
            (buff_FreeQueue_TotalCount - RSVD_NUMBER_BUFFERS) / NumProcs;
    GetActiveCPUMap (&CPUsActiveMask);
    for (i=0; i < MAXIMUM_NUMBER_OF_PROCESSORS; i++)
    {
        if (CPUsActiveMask & CPUMask) /* set max allowed on local queues */
            buff_FreeLocQueue_MaxCount[i] = buff_FreeQueue_MaxLocalCount;
            CPUMask = CPUMask << 1;
    }
    unlock(buff_FreeQueue_Lock); /* free lock */
    RestoreProcessorState (flags);
} /* end ProcStatusOnLine */
*   Name:
*       void ProcStatusOLine (LONG CPUNumber);
*
*   Description:
*       Function is notified when a Processor goes OFFLINE,
*       which in turn calls functions to redistribute the buffers among the
*       Local buffer Free Queues based on the number of processor's
*
*   Parameters in:
*       CPUNumber Number that identifies CPU that went ONLINE
*
*   Values returned: none
*
void ProcStatusOffLine (LONG CPUNumber)
{
    LONG flags = 0, i = 0, CPUMask = 1;
    LONG NumProcs = 0, NumLocalbuff = 0, CPUsActiveMask = 0, NumExtra = 0;
    buff_t *pbuff = NULL, *pbuff_tail = NULL;
    flags = DisableProcessorAndSaveState();
    lock(buff_FreeQueue_Lock); /* get lock */
    /* return all Free local buffers to Global list */
    if (buff_FreeLocQueue_Head[CPUNumber] ) /* test if have any */
    {
        /* get links and add to global links */
        pbuff = buff_FreeLocQueue_Head[CPUNumber];
        pbuff_tail = buff_FreeLocQueue_Tail[CPUNumber];
                /* Reset HEad / Tail pointers */
        buff_FreeLocQueue_Tail[CPUNumber] =
                (buff_t*) &buff_FreeLocQueue_Head[CPUNumber];
        buff_FreeLocQueue_Head[CPUNumber] = NULL;
        NumExtra = buff_FreeLocQueue_Count[CPUNumber];
        buff_FreeLocQueue_Count[CPUNumber] = 0; /* reset counter */
                /* Add buffers removed from Local Queue to Global Queue */
        buff_FreeQueue_Tail->nextLink = pbuff;
        buff_FreeQueue_Tail = pbuff_tail;
        buff_FreeQueue_Count += NumExtra;
    }
    /* Set minimum value in case take Interrupt before get an
        Event that a processor has come on line */
    buff_FreeLocQueue_MaxCount[CPUNumber] = RSVD_NUMBER_BUFFERS *
    /* Now update other Local Free buffer's queues that more buffers are
        available from Global queue buff_FreeQueue_Head/Tail/Count */
    NumProcs = MAXIMUM_NUMBER_OF_PROCESSORS;
    buff_FreeQueue_MaxLocalCount =
            (buff_FreeQueue_TotalCount - RSVD_NUMBER_BUFFERS) / NumProcs;
    NumLocalbuff = NumExtra / NumProcs;
    GetActiveCPUMap (&CPUsActiveMask);
    for (i=0; i < MAXIMUM_NUMBER_OF_PROCESSORS; i++)
    {
        if (CPUsActiveMask & CPUMask) /* increase max allowed on other local queues */
            buff_FreeLocQueue_MaxCount[i] += NumLocalbuff;
        CPUMask = CPUMask << 1;
```

-continued

```
    }
    unlock(buff_FreeQueue_Lock); /* free lock */
    RestoreProcessorState (flags);
} /* end ProcStatusOfLine */
/*
*   Name:
*      LONG ReDistBuffersToLocalQ (LONG NumXtra, LONG CPU);
*
*   Description:
*      Function redistributes the buffers from the Global Free Queue
*      to the Local buffer Free Queue based on the processor's number input
*
*   Parameters in:
*      NumXtra    Number of buffers to place on each Local Free Queue
*      CPU        CPU's number to add buffs too
*
*   Values returned: 0   Success
*                    1   Failure
*
*   Implied parameters: buff_FreeQueue_Head, buff_FreeQueue_Tail
*       buff_FreeQueue_Count buff_FreeQueue_TotalCount
*       buff_FreeLocQueue_Head[], buff_FreeLocQueue_Tail[]
*
*       Assumes protected by Mutex.
*
*/
LONG ReDistBuffersToLocalQ (LONG NumXtra, LONG CPU)
{
    buff_t *buff= NULL, *buff_tmp = NULL;
    LONG j = 0;
    if (NumXtra && ((buff = buff_FreeQueue_Head) != NULL))
    {
        for (j = 1; j <NumXtra; j++)
            buff = buff->nexLink;
        buff_tmp = buff_FreeQueue_Head;
        buff_FreeQueue_Head = buff->nexLink;
        buff_FreeQueue_Count = buff_FreeQueue_Count - NumXtra;
        buff->nextLink = NULL;
        buff_FreeLocQueue_Tail[CPU]->nextLink = buff_tmp;
        buff_FreeLocQueue_Tail[CPU] = buff;
        buff_FreeLocQueue_Count[CPU] += NumXtra;
        if (buff_FreeQueue_Head = NULL)
            buff_FreeQueue_Tail = (buff_t*) &buffFreeQueue_Head;
    }
    return (0);
} /* end ReDistBuffersToLocalQ */
```

Summary

In summary, the present invention provides a novel system and method for managing resources in a cluster. Remote memory probes and emergency messages through a shared disk can be used to manage the nodes themselves, as well as the interconnects and the system area network switches. Minimal locking in concert with careful use of interrupts can be used to manage sharable resources when a node or processor is taken down, comes up, or needs to obtain or release for some other reason sharable resources such as memory buffers.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A Method for managing resources in a cluster, the method comprising the computer-implemented steps of:
   remotely probing memory in a device in the cluster; and
   using one of the following to determine whether the probed device has failed: a counter value retrieved by the remote probing, or the unavailability of such a counter value;
   wherein the probing step probes volatile memory in a remote cluster node.

2. The method of claim 1, wherein the probing step and the using step are repeated at predetermined intervals to monitor the remote device.

3. The method of claim 1, wherein the probing step and the using step are performed in preparation for sending at least one of the following to the remote device: data, or control information.

4. The method of claim 1, wherein the using step determines that the remote device has failed in response to determining that the counter value equals a previously retrieved counter value.

5. The method of claim 1, wherein the using step determines that the remote device has failed in response to the presence of a status value retrieved by the probing step.

6. The method of claim 1, further comprising the step of removing from the cluster a failed node, the node's failure being detected by the probing and using steps.

7. A method for managing resources in a cluster, the method comprising the computer-implemented steps of:
   remotely probing memory in a device in the cluster; and
   using one of the following to determine whether the probed device has failed: a counter value retrieved by the remote probing, or the unavailability of such a counter value;
   wherein the probing step probes memory in a remote cluster interconnect.

8. The method of claim 7, wherein the probing step and the using step are repeated at predetermined intervals to monitor the remote device.

9. The method of claim 7, wherein the probing step and the using step are performed in preparation for sending at least one of the following to the remote device: data, or control information.

10. The method of claim 7, wherein the using step determines that the remote device has failed in response to determining that the counter value equals a previously retrieved counter value.

11. The method of claim 7, wherein the using step determines that the remote device has failed in response to the presence of a status value retrieved by the probing step.

12. The method of claim 7, further comprising the step of removing from the cluster a failed node, the node's failure being detected by the probing and using steps.

13. A method for managing resources in a cluster, the method comprising the computer-implemented steps of:
   remotely probing memory in a device in the cluster; and
   using one of the following to determine whether the probed device has failed: a counter value retrieved by the remote probing, or the unavailability of such a counter value;
   wherein the probing step probes volatile memory in a remote system area network switch.

14. The method of claim 13, wherein the probing step and the using step are repeated at predetermined intervals to monitor the remote device.

15. The method of claim 13, wherein the probing step and the using step are performed in preparation for sending at least one of the following to the remote device: data, or control information.

16. The method of claim 13, wherein the using step determines that the remote device has failed in response to determining that the counter value equals a previously retrieved counter value.

17. The method of claim 13, wherein the using step determines that the remote device has failed in response to the presence of a status value retrieved by the probing step.

18. The method of claim 13, further comprising the step of removing from the cluster a failed node, the node's failure being detected by the probing and using steps.

19. A method for managing resources in a cluster, the method comprising the computer-implemented steps of:
   remotely probing memory in a device in the cluster; and
   using one of the following to determine whether the probed device has failed: a counter value retrieved by the remote probing, or the unavailability of such a counter value;
   wherein the probing step probes memory in a remote cluster node and also probes memory in a remote system area network switch.

20. The method of claim 19, wherein the probing step and the using step are repeated at predetermined intervals to monitor the remote device.

21. The method of claim 19, wherein the probing step and the using step are performed in preparation for sending at least one of the following to the remote device: data, or control information.

22. The method of claim 19, wherein the using step determines that the remote device has failed in response to determining that the counter value equals a previously retrieved counter value.

23. The method of claim 19, wherein the using step determines that the remote device has failed in response to the presence of a status value retrieved by the probing step.

24. The method of claim 19, further comprising the step of removing from the cluster a failed node, the node's failure being detected by the probing and using steps.

25. A method for managing resources in a cluster, the method comprising the computer-implemented steps of:
   remotely probing memory in a device in the cluster; and
   using one of the following to determine whether the probed device has failed: a counter value retrieved by the remote probing, or the unavailability of such a counter value;
   wherein the probing step probes nonvolatile memory in a shared storage device accessible by a remote cluster node.

26. The method of claim 25, wherein the probing step and the using step are repeated at predetermined intervals to monitor the remote device.

27. The method of claim 25, wherein the probing step and the using step are performed in preparation for sending at least one of the following to the remote device: data, or control information.

28. The method of claim 25, wherein the using step determines that the remote device has failed in response to determining that the counter value equals a previously retrieved counter value.

29. The method of claim 25, wherein the using step determines that the remote device has failed in response to the presence of a status value retrieved by the probing step.

30. The method of claim 25, further comprising the step of removing from the cluster a failed node, the node's failure being detected by the probing and using steps.

31. A method for managing resources in a cluster, the method comprising the computer-implemented steps of:
   remotely probing memory in a device in the cluster; and
   using one of the following to determine whether the probed device has failed: a counter value retrieved by the remote probing, or the unavailability of such a counter value;
   wherein the using step is preceded by the step of determining the validity of the counter value.

32. The method of claim 31, wherein the probing step and the using step are repeated at predetermined intervals to monitor the remote device.

33. The method of claim 31, wherein the probing step and the using step are performed in preparation for sending at least one of the following to the remote device: data, or control information.

34. The method of claim 31, wherein the using step determines that the remote device has failed in response to determining that the counter value equals a previously retrieved counter value.

35. The method of claim 31, wherein the using step determines that the remote device has failed in response to the presence of a status value retrieved by the probing step.

36. The method of claim 31, further comprising the step of removing from the cluster a failed node, the node's failure being detected by the probing and using steps.

37. A method for managing resources in a cluster, the method comprising the computer-implemented steps of:

remotely probing memory in a device in the cluster;

using one of the following to determine whether the probed device has failed: a counter value retrieved by the remote probing, or the unavailability of such a counter value; and removing from the cluster a failed node, the node's failure being detected by the probing and using steps, wherein the removing step comprises writing to a predetermined emergency message location on a nonvolatile storage device that was and possibly still is accessible to the failed node.

38. The method of claim 37, wherein the probing step and the using step are repeated at predetermined intervals to monitor the remote device.

39. The method of claim 37, wherein the probing step and the using step are performed in preparation for sending at least one of the following to the remote device: data, or control information.

40. The method of claim 37, wherein the using step determines that the remote device has failed in response to determining that the counter value equals a previously retrieved counter value.

41. The method of claim 37, wherein the using step determines that the remote device has failed in response to the presence of a status value retrieved by the probing step.

42. A method for managing resources in a cluster, the method comprising the computer-implemented steps of:

remotely probing memory in a device in the cluster;

using one of the following to determine whether the probed device has failed: a counter value retrieved by the remote probing, or the unavailability of such a counter value; and removing from the cluster a failed node, the node's failure being detected by the probing and using steps, wherein the removing step comprises returning to a global queue resources that were previously allocated to the failed node.

43. The method of claim 42, wherein the probing step and the using step are repeated at predetermined intervals to monitor the remote device.

44. The method of claim 42, wherein the probing step and the using step are performed in preparation for sending at least one of the following to the remote device: data, or control information.

45. The method of claim 42, wherein the using step determines that the remote device has failed in response to determining that the counter value equals a previously retrieved counter value.

46. The method of claim 42, wherein the using step determines that the remote device has failed in response to the presence of a status value retrieved by the probing step.

47. A computer system comprising:

at least two interconnected nodes capable of presenting a uniform system image such that an application program views the interconnected nodes as a single computing platform; and a management means for managing computational resources for use by the nodes, wherein the management means comprises a means for detecting node failure by remotely probing memory.

48. A computer system comprising:

at least two interconnected nodes capable of presenting a uniform system image such that an application program views the interconnected nodes as a single computing platform; and a management means for managing computational resources for use by the nodes, wherein the management means comprises a means for detecting interconnect failure by remotely probing memory.

49. A computer system comprising:

at least two interconnected nodes capable of presenting a uniform system image such that an application program views the interconnected nodes as a single computing platform; and a management means for managing computational resources for use by the nodes, wherein the management means comprises a means for detecting system area network switch failure by remotely probing memory.

50. A computer system comprising:

at least two interconnected nodes capable of presenting a uniform system image such that an application program views the interconnected nodes as a single computing platform; and a management means for managing computational resources for use by the nodes, wherein the management means comprises a means for one node to monitor a communication path to another node by remotely probing memory at regular time intervals.

51. The system of claim 50, wherein the probing intervals are staggered with respect to time intervals at which the probed memory is regularly updated during normal operation of the node being probed.

52. A computer system comprising:

at least two interconnected nodes capable of presenting a uniform system image such that an application program views the interconnected nodes as a single computing platform; and a management means for managing computational resources for use by the nodes, wherein the management means comprises a means for a first node to monitor a communication path to a second node by remotely probing memory in preparation for sending a message from the first node to the second node.

53. A computer system comprising:

at least two interconnected nodes capable of presenting a uniform system image such that an application program views the interconnected nodes as a single computing platform; and a management means for managing computational resources for use by the nodes, wherein the management means comprises a remote memory probing and evaluation means for a first node to distinguish between a first condition in which a second node and an interconnect connected to the second node are operating normally and a second condition in which the second node is restarting and the interconnect is operating normally.

54. A computer system comprising:

at least two interconnected nodes capable of presenting a uniform system image such that an application program views the interconnected nodes as a single computing platform; and a management means for managing computational resources for use by the nodes, wherein the management means comprises a remote memory probing and evaluation means for a first node to distinguish between a first condition in which a second node and an interconnect connected to the second node are operating normally and a second condition in which the second node is operating normally after recently restarting and the interconnect is operating normally.

55. A computer system comprising:

at least two interconnected nodes capable of presenting a uniform system image such that an application program views the interconnected nodes as a single computing platform; and a management means for managing computational resources for use by the nodes, wherein the management means comprises a remote memory probing and evaluation means for a first node to distinguish between a first condition in which a second node and an interconnect connected to the second node are operating normally and a second condition in which software running on the second node has failed and the interconnect is operating normally.

56. A computer system comprising:

at least two interconnected nodes capable of presenting a uniform system image such that an application program views the interconnected nodes as a single computing platform; and a management means for managing computational resources for use by the nodes, wherein the management means comprises a remote memory probing and evaluation means for a first node to distinguish between a first condition in which a second node and an interconnect connected to the second node are operating normally and a second condition in which the second node has yielded control to a debugger and the interconnect is operating normally.

57. A computer system comprising:

at least two interconnected nodes capable of presenting a uniform system image such that an application program views the interconnected nodes as a single computing platform; and a management means for managing computational resources for use by the nodes, wherein the management means comprises a remote memory probing and evaluation means for a first node to distinguish between a first condition in which a second node and an interconnect connected to the second node are operating normally and a second condition in which hardware within the second node has failed and the interconnect is operating normally.

58. A computer system comprising:

at least two interconnected nodes capable of presenting a uniform system image such that an application program views the interconnected nodes as a single computing platform; and a management means for managing computational resources for use by the nodes, wherein the management means comprises a remote memory probing and evaluation means for a first node to distinguish between a first condition in which an interconnect connected to a second node is operating normally and a second condition in which the interconnect has failed.

59. A computer system comprising:

at least two interconnected nodes capable of presenting a uniform system image such that an application program views the interconnected nodes as a single computing platform; and a management means for managing computational resources for use by the nodes, wherein the management means comprises a means for remotely probing memory to obtain a probe structure containing a counter.

60. The system of claim 59, wherein the management means comprises a means for remotely probing memory to obtain a probe structure further containing a validation field for validating the counter.

61. The system of claim 59, wherein at least one of the nodes is a special-purpose graphics node.

62. The system of claim 59, wherein at least one of the nodes is a special-purpose signal processing node.

63. A computer system comprising:

at least two interconnected nodes capable of presenting a uniform system image such that an application program views the interconnected nodes as a single computing platform; and a management means for managing computational resources for use by the nodes, wherein the management means comprises a means for remotely probing memory to obtain a probe structure containing an epoch.

64. A computer system comprising:

at least two interconnected nodes capable of presenting a uniform system image such that an application program views the interconnected nodes as a single computing platform; and a management means for managing computational resources for use by the nodes, wherein the management means comprises a means for remotely probing memory to obtain a probe structure containing a root pointer.

65. A computer system comprising:

at least two interconnected nodes capable of presenting a uniform system image such that an application program views the interconnected nodes as a single computing platform; and a management means for managing computational resources for use by the nodes, wherein the management means comprises a means for remotely probing memory to obtain a probe structure containing a status summary.

66. A computer storage medium having a configuration that represents data and instructions which will cause at least a portion of a computer system to perform method steps for managing resources in a cluster computing system, the method steps comprising the steps of claim 1.

67. A computer storage medium having a configuration that represents data and instructions which will cause at least a portion of a computer system to perform method steps for managing resources in a cluster computing system, the method steps comprising the steps of claim 7.

68. A computer storage medium having a configuration that represents data and instructions which will cause at least a portion of a computer system to perform method steps for managing resources in a cluster computing system, the method steps comprising the steps of claim 13.

69. A computer storage medium having a configuration that represents data and instructions which will cause at least a portion of a computer system to perform method steps for managing resources in a cluster computing system, the method steps comprising the steps of claim 19.

70. A computer storage medium having a configuration that represents data and instructions which will cause at least a portion of a computer system to perform method steps for managing resources in a cluster computing system, the method steps comprising the steps of claim 25.

71. A computer storage medium having a configuration that represents data and instructions which will cause at least a portion of a computer system to perform method steps for managing resources in a cluster computing system, the method steps comprising the steps of claim 31.

72. A computer storage medium having a configuration that represents data and instructions which will cause at least a portion of a computer system to perform method steps for managing resources in a cluster computing system, the method steps comprising the steps of claim 37.

73. A computer storage medium having a configuration that represents data and instructions which will cause at least a portion of a computer system to perform method steps for managing resources in a cluster computing system, the method steps comprising the steps of claim 42.

* * * * *